June 3, 1941.   H. J. MURRAY ET AL   2,244,171
VEHICLE SIGNAL SYSTEM
Filed Sept. 10, 1937    2 Sheets-Sheet 1

Inventors
Howard J. Murray
Walter F. Rugg

June 3, 1941.  H. J. MURRAY ET AL  2,244,171
VEHICLE SIGNAL SYSTEM
Filed Sept. 10, 1937  2 Sheets-Sheet 2

Inventors
Howard J. Murray
Walter O. Rugg

Patented June 3, 1941

2,244,171

UNITED STATES PATENT OFFICE 2,244,171

VEHICLE SIGNAL SYSTEM

Howard J. Murray, New York, N. Y., and Walter S. Rugg, Pittsburgh, Pa.; Howard V. Rugg and Commonwealth Trust Co., Pittsburgh, Pa., executors of Estate of said Walter S. Rugg, deceased Application September 10, 1937, Serial No. 163,224

11 Claims. (Cl. 200—59)

Our invention relates in general to a semi-automatic co-incidental signalling system for use wherever such a system may be employed, and the invention specifically relates to a signalling system designed for use on an automotive vehicle equipped with turning and braking means for indicating certain intents and subsequent actions of the operator of the vehicle.

The primary object of the invention is to provide means for selectively supplying constant and intermittent current to conventional signal units so as to employ the said units collectively and individually so as to indicate more than one intent of the operator, and to also automatically indicate the conclusion of an indicated intent as a function of the turning of the vehicle in a direction opposite to that indicated.

Another object of the present invention is to provide an intermittent or variable intensity signal which may be initiated manually, and which signal will continue automatically without any attention on the part of the operator after the initiating action has ceased and thereafter until a subsequent turning of the vehicle in a direction opposite to that indicated by the signal.

Still another object of the present invention is to provide means for permitting the turning of a vehicle steering wheel to control the status of a stationary control switch without any mechanical or frictional connection between the switch and steering wheel.

A further object of the present invention is to provide a semi-coincidental turn signal control means that may be manually set into selective operation to thereafter remain operatively undisturbed as a function of the directional operation of the vehicle steering mechanism, and subsequently to be coincidently returned magnetically to its neutral position as a function of the straightening operation of the said steering mechanism.

Various other objects and advantages of the invention will be in part obvious from an inspection of the accompanying drawings and will in part be more fully set forth in the following particular description of one form of mechanism embodying my invention, and the invention also consists of certain new and novel features of construction and combination of parts hereinafter set forth and claimed.

Figure 1:
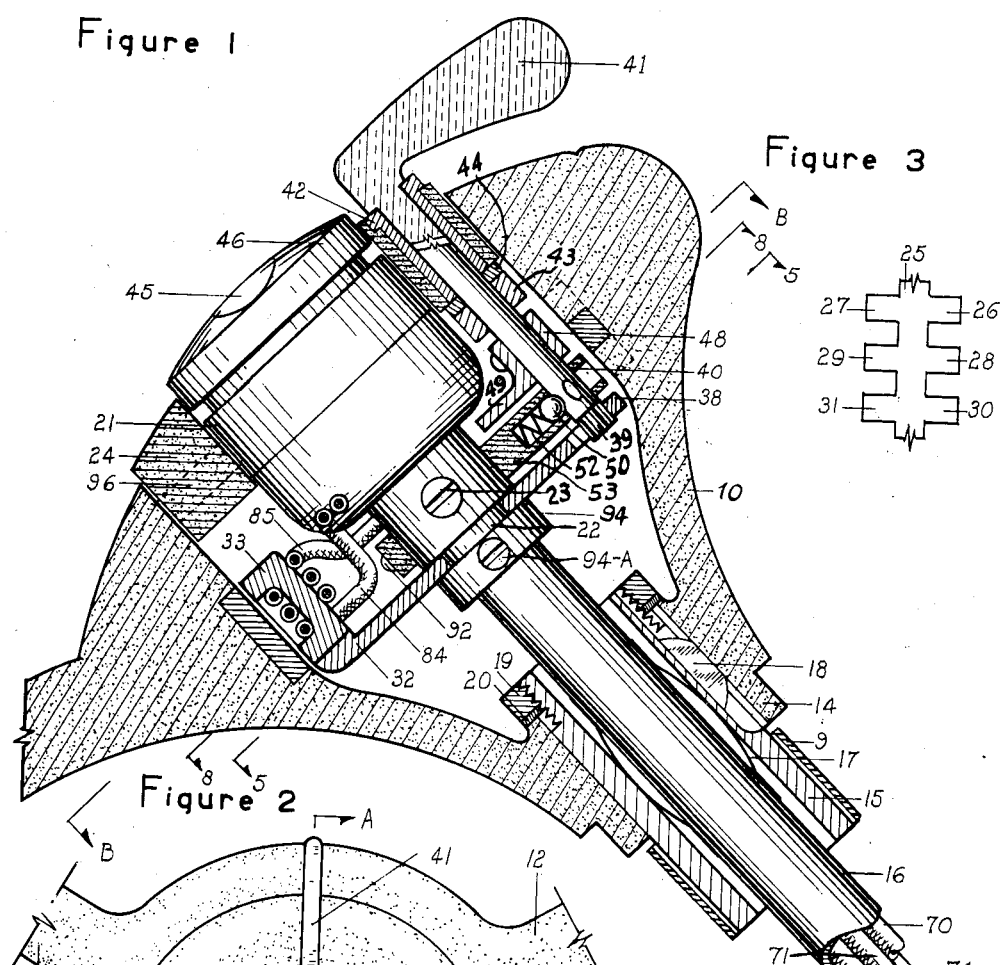
Figure 1 is a partial sectional view in elevation taken axially of the upper portion of a steering gear assembly modified with a preferred embodiment of the present invention.

In the drawings, referring first to the conventional parts, there is disclosed a fixed steering post 9, the lower end of which is secured to a conventional housing (not shown) containing a steering worm and a gear connection (not shown) as is well known in such construction.

The steering post 9 constitutes the outer of three tubular members of which the steering column 15 constitutes the intermediate member and a hollow fixed control shaft 16 constitutes the innermost member. The shaft 16 extends beyond the opposite ends of the rotatable steering column 15 for a reason hereinafter described, and together with the steering column is mounted about a common axis which is also the axis of the fixed steering post 9.

The steering column 15 is provided at its upper end with a steering wheel which has spokes 11, 12 and 13. The spokes 11, 12 and 13 connect the hub portion 10 of the wheel with the rim (not shown). The hub 10 is formed at its center with an opening extending therethrough and partially outlined by a metallic armature member 25 of a size to operatively receive a signal switch control plate 32 hereinafter described.

The hub 10 is secured to the upper end of the steering column 15 by means of the key 18, nut 19, and washer 20 as is usual in such construction. The hub portion 14 is provided with an annular recess aligned with and forming a continuation of the opening above.

A cylindrical member 21 with an axially extending hub extension 22 is attached to the member 16 by means of the set screw 23. This cylindrical member 21 is formed to receive the current leads 70—74 inclusive. These leads extend into the member 21 (see Figure 6), with portions arranged to move axially into and out of the member 21 in a similar manner to the horn button assembly shown in a co-pending application Serial No. 113,587, filed December 1, 1936, and the said cylindrical member 21 is also arranged to include a pilot lamp (see Figure 6) 86 connected to the leads 70 and 73 by means of the leads 84 and 85. This conventional pilot lamp is secured to a conventional socket (not shown) in a similar manner to the pilot lamp shown in the above identified co-pending application. The horn button 46 is provided with a transparent window 45 through which the light from the pilot lamp filament 86 may be viewed by the operator.

Figure 5:
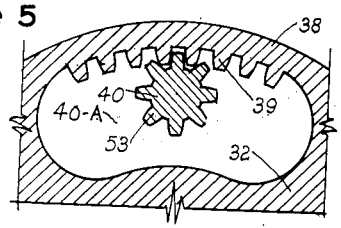
Figure 5 is a partial sectional plan view taken along the line 5—5 of Figure 1 showing the control gearing means of the manual control.

A resetting plate 32 is positioned so as to rotate about the axis of the shaft 16 and is secured against axial movement as it rotates by means of the collar 94 in turn secured to the shaft 16 by means of the set screw 94—A. This plate 32 is formed with a toothed opening 40—A (see Figure 5) provided with teeth 39 on the portion 38 to receive the mating teeth 53 of the pinion 40 constituting a control shaft attached to the control lever 41. The plate 32 supports a plurality of flux path pole means 33—37 inclusive (see Figure 7). Each of the elements 33—37 is provided with a flux producing winding 47, and all of the said windings are preferably connected in series with the leads 97 and 98 as shown diagrammatically in Figure 6.

Figure 7:
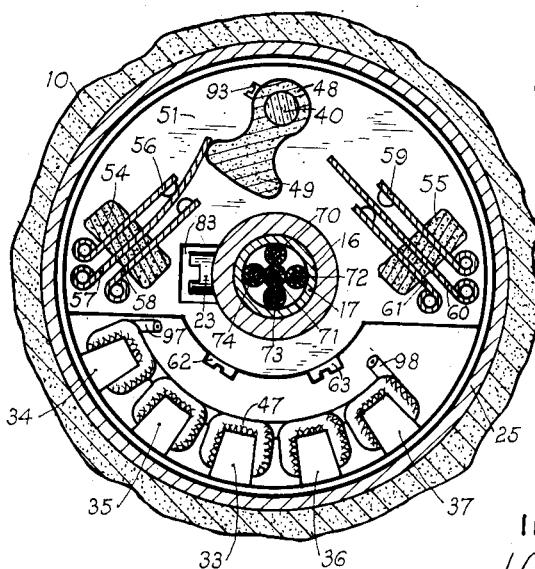
Figure 7 is a sectional plan view of the means of Figure 1 taken along the line B—B in the direction indicated by the arrows showing the manually operated signal control in an operated position.
Figure 8:
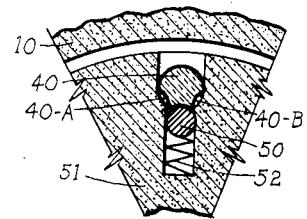
Figure 8 is a partial sectional view taken along the line 8—8 of Figure 1 showing in enlarged detail the means for holding the manually operated control in a neutral position and two settable positions.

A second plate preferably formed of insulating material as designated by the numeral 51 is attached to the axially extending portion 22 of the member 21 by means of the set screws 62 and 63 (see Figure 7) and is formed with an opening to position the pinion shaft 40 as it is rotated by the lever 41. A locking ball 50 (see Figure 8) is positioned in a recess formed in the plate 51 by means of the spring 52 so as to hold the said ball 50 in neutral position as shown in Figure 8 or in the depressions 40—A and 40—B as the lever 41 is manually turned to the right or left. The upper end of the pinion shaft 40 is positioned in the bushing 42 in turn securely positioned in the ring shaped member 24 secured to the cylindrical member 21 by means of the set screw 96 (shown in dotted outline). The pinion shaft 40 is secured against axial movement by means of the washer 44 and the tight fitting collar 43. An actuating cam 48 is secured to the shaft 40 by means of the set screw 93 (see Figure 7) for rotation therewith.

Figure 6:
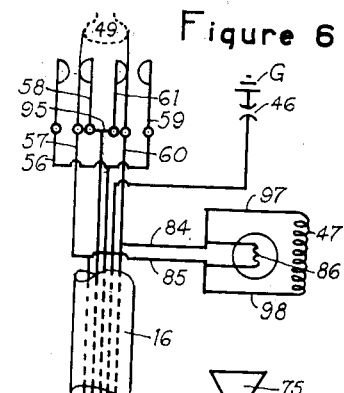
Figure 6 is a diagrammatic presentation of the circuit elements and the necessary electrical connections to complete an embodiment of our invention.

This cammed actuator 48 is normally positioned on the plate 51 so as to bring the portion 49 to normally remain symmetrically between two circuit closers including spring elements 56, 57 and 58 securely held and positioned in the base portion 54. These spring elements are connected to the leads 70, 71, 72 and 74 as shown in Figure 6. The spring elements 58 and 61 are connected to the lead 71 by means of the common connector 95.

In Figure 6 there is shown more or less symbolically the circuit connections of an embodiment of the present invention. A source of current B is connected to the ground G by means of the lead 90. The other side of the source of current is connected to a circuit breaker of a suitable conventional type. This circuit breaker 81 is connected to the leads 76, 78, 83 and 89. A conventional horn signal 75 is connected between the leads 74 and 76. A conventional thermostatic current interrupter 77 is connected between the leads 72 and 78. A normally open brake operated switch 79 of a conventional type is connected between the leads 88 and 71. A conventional tail light switch 80 is connected between the leads 82 and 89. A tail light 67 (or a plurality of tail lights) with a filament 66 is connected to the ground G. A conventional stop light 65 with a stop light filament 64 is connected to the ground G by means of the lead 65—A. The lead 82—A connected to the lead 73 may be connected to other lights similar to the light 65. A conventional stop light 69 provided with the filament 68 is connected to the ground G by means of the lead 69—A. A lead 70—A is connected to the lead and may supply current to lights simultaneously with the supply of current to the light 69. These lights (not shown) may be attached to the front of the vehicle.

In operation, let it be assumed that the means of Figure 1 are normally in the position shown and that the operator of the vehicle intends to turn the vehicle to the right. Accordingly the lever 41 (see Figure 2) is manually turned to the right. This action turns the control shaft 40 therewith. The teeth 53 (see Figure 5) also rotate therewith to turn the teeth 39 forming the portion 38 of the plate 32. The cammed member 48 also simultaneously turns with the control shaft 40 to move the cammed portion 49 as shown in Figure 7 to flex the resilient switch portion 57 so as to move the switch element 57 out of electrical engagement with the switch element 58 and into electrical engagement with the switch element 56. The ball 50 is moved by the shaft 40 against the spring 52 so that it rides into the depression 40—B to lock the shaft 40 and thereby the lever 41 into a settable "right" position when the operator's hand is removed. If the normally open foot brake switch 79 is closed before the lever 41 is turned to the left the filaments 64 and 68 will both be energized to act as stop signals. When the lever 41 is turned to the left under these conditions the constant energization of the filament 68 will cease and intermittent current will be delivered to the filament 68. This is true, because current will now flow from the battery B, lead 78, thermostatic interrupter 77, lead 72, switch elements 56 and 57, lead 70 to intermittently energize the filament 68 as a right direction signal. At the same time current will flow through the leads 84 and 85 to energize the filament 86 of the pilot lamp and the leads 97 and 98 to energize the flux producing windings 47 so as to create a magnetic flux in the pole pieces 33 to 37 inclusive.

Figure 3:
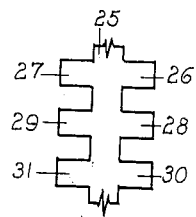
Figure 3 is a partial plan view of the resetting armature constituting a fixed portion of the steering wheel of Figure 1.

The operator now turns the steering wheel and thus the hub portion 10 to the right. The armature portions 26—27, 28—29 and 30—31 of the armature 25 (see Figure 3) will tend to drag the energized pole pieces 33—37 inclusive with it, but the disc or plate 32 is locked against further right movement by means of the ball 50 (and the opening 40—A of Figure 5). No matter through what angle the steering wheel is turned so as to turn the vehicle to the right, there will be no further movement of the plate 32 due to the holding action of the detent ball 50 and the stop provided by the edges of the opening formed in the portion 38 of the plate 32.

Now let it be assumed that the operator turns the steering wheel to return the vehicle to a straight forward driving motion. The steering wheel will be turned relatively to the left and the portions 33—37 inclusive will now be dragged by the armature portions 26—27, 28—29 and 30—31 so as to move relatively counter-clockwise (as viewed in Fig. 7). This action will cause the piece 39 to rotate the teeth 53 to rotate the shaft 40 to move the ball of Figure 8 out of the depression 40—B against the force of the spring 52 and into the neutral depression. At the same time the switch element 57 will be moved out of electrical contact with the switch element 56 as the cammed portion 49 is moved with the shaft 40.

As the switch element 57 is moved out of engagement with the element 56 the leads 84 and 85 will no longer be subject to a difference of potential due to the intermittent opening of the thermostatic interrupter 77, and neither the filament 86 or the flux producing winding 47 will be energized whether the normally open brake operated switch 79 is open or closed. Thus whenever the lever 41 is manually operated from its neutral position shown in Figure 2 either to the left or to the right to flex the switch elements 57 or 60 the pilot filament 86 and the flux producing winding 47 will be intermittently energized whether the foot brake switch 79 is open or closed, and when the lever 41 is in the position shown in Figure 2 the pilot filament and the said winding will not be energized when the said switch 79 is open or closed. In this event the pilot lamp will flash whenever either of the signal filaments 64 and 68 are intermittently energized as direction signals, and will not flash when they are constantly energized as conventional stop signals. This is true, because with the lever 41 moved to the right operative position as the brake pedal switch 79 is open and the thermostat closed-current will flow through lead 72, switch elements 56 and 57, lead 70 and filament 68 to the ground G to energize the lamp 69 as a right direction signal. At the same time, current will flow through the lead 72, switch elements 56 and 57, lead 85, filament 86 and winding 47 in parallel, leads 84 and 73 to filament 64 and thence to the ground G to energize the pilot filament 86 and the winding 47. The current flowing through the filaments 86 and 64 in series will cause the pilot filament 86 to become visible, but filament 64 will remain invisible because of its relative current capacity.

Figure 2:
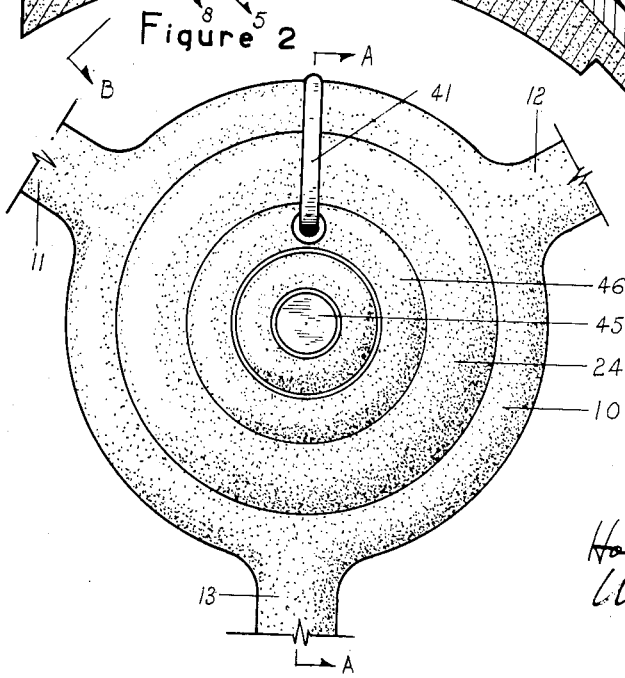
Figure 2 is a top view of the central portion of the steering wheel and associated signal controls.
Figure 4:
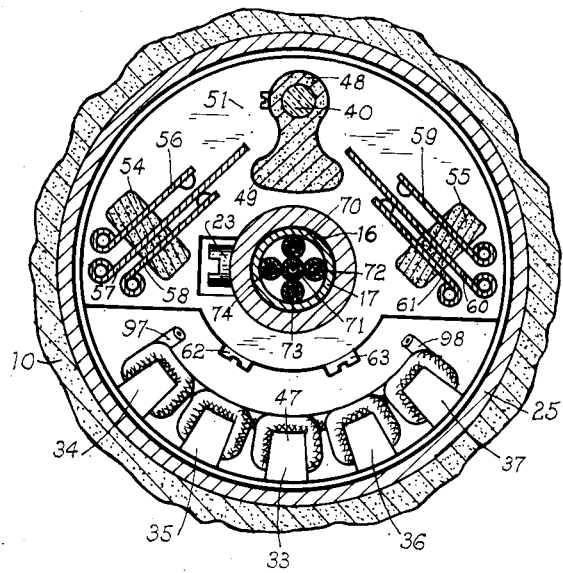
Figure 4 is a sectional plan view of the means of Figure 1 taken along the line B—B in the direction indicated by the arrows showing the manually operated signal control in a neutral position.

When the lever 41 of Figure 2 is moved to the left, current will also flow through the pilot filament 86 and the winding 47 when the brake lever switch 79 is open. Current will flow through lead 72, switch elements 59 and 60, lead 73, filament 64 to the ground G. This current will energize the filament 64 as a left direction signal. At the same time current will also flow through the lead 84, pilot filament 86 and winding 47 in parallel, lead 85, lead 70 and filament 68 to the ground G. This current will energize the pilot filament 86 and the winding 47.

The horn button 46 may be depressed co-incidentally with the operation of the lever 41. It is obvious that the operator may move the lever from a neutral position and depress the horn button with one motion of the hand, or the lever may be operated without depressing the horn button. In the same manner the horn button may be depressed without operating the lever 41.

If the operator now intends to turn the vehicle, the lever 41 may be rotated to the left. The control shaft 40 would be rotated counter-clockwise as viewed from the top side of Figure 7 to rotate the cammed member 48 and the cam portions 49 counter-clockwise to flex the switch element 60 so as to move the element 60 out of electrical engagement with the switch element 61 and into electrical engagement with the element 59. At the same time the teeth 53 will move the teeth 39 and thus the plate member 32 and thus the flux producing windings 47 and the poles 33—37 inclusive counter-clockwise. Subsequent rotation of the steering wheel and the attached armature 25 counter-clockwise will have no effective rotative effect on the plate 32 as the control shaft 40 will be locked in a "left" position.

However, as the operator turns the steering wheel in a direction opposite to that indicated by the intermittently energized "left" direction signal filament 64 (with the flux producing winding 47 still energized) the armature 25 will act to pull the poles 33—37 with it as it is rotated clockwise with the steering wheel hub. This resetting torque will be transmitted to the teeth 39 and thereby to the teeth 53 to turn the control rod 40 clockwise to pull the ball 50 out of its "left" set position and to thereafter return the lever 41 to its normal neutral position. In this event the switch element 60 will move out of electrical relation with the switch element 59 and into the stop signal relation with the switch element 61. With this action the pilot lamp filament 86 and the flux producing winding 47 will no longer be energized. Thus there will no longer be any pull on the poles 33—37 by the armature 25 and the steering wheel will be entirely free of any stationary portion of the steering mechanism. The signal will thereby be returned to its normal stop signal status.

During periods of low visibility the rear signal switch 80 will be closed, and the rear signal 67 (or signals) will be constantly energized to act as reference points to the filaments 64 and 68 when the same are selectively energized as direction signals when the brake switch 79 is open.

The present invention is directed to an article of manufacture which may be installed in conventional steering mechanisms without any change. The means connected to the stationary shaft 16 may be installed as a complete unit. The said means may be also removed as a unit for inspection and repair without affecting the normal operation of the steering mechanism. For example, the means supported on the fixed shaft 16 and the shaft itself may be entirely removed from the vehicle without affecting the normal operation of the vehicle.

According to the present disclosure there has been provided a direction signal system and an associated control which is very flexible in its operation of changing from one operation to another. The change from a direction signal status to a stop signal status of the filaments 64 and 68 is co-incidentally effected without any mental effort on the part of the operator, and without any mechanical connection with any operative portion of the vehicle.

For example, if the operator changes his intentions, and turns to the left after he has signalled his intention to turn to the right, the right signal will automatically be stopped as the subsequent left turn is made.

Any number of poles as 33—37 may be employed and the angle of wheel turn necessary for a resetting action may be made very small by proper design of the parts. A right turn signal may be given as the vehicle is still turning to the left. This is important at traffic circles, as the operator makes a right turn (relative to other vehicles) as his vehicle is turning to the left. The operator may set the left turn signal as he is also turning to the left. The horn button may be operated at any time as the signal or resetting operations are taking place.

Having thus described our invention, we claim:

1. The combination of a hollow steering shaft, a steering wheel on the shaft, a hollow fixed shaft enclosed within the hollow shaft formed to receive a plurality of circuit portions, a manually actuated switch operating member rotatably mounted on the fixed shaft, a switch mounted on said fixed shaft, connected to said circuit portions and selectively actuated by the said member, resilient locking means for selectively holding the said switch in an on position and two off positions, means carried by the said wheel providing portions of flux paths, and means rotatably supported on the fixed shaft for producing a magnetic flux in the said paths upon the actuation of the said switch, said flux similarly acting at any position of the wheel to magnetically and yieldably connect the flux producing means and the steering wheel to act to return the said operating member and said switch to a normal position upon a rotation of the steering wheel toward straight ahead position.

2. The combination of a hollow steering shaft, a steering wheel on the shaft, a hollow fixed shaft enclosed within the hollow shaft provided with elements of a direction signal switch and circuit means for supplying current to the said elements, a manually actuated switch operating member mounted on the said fixed shaft and including rotatable elements associated with the said switch elements, a plurality of rotatable flux producing elements associated with the said operating member and the said switch and connected to be energized upon an initial movement of the member from a neutral position, flux path means forming a portion of the said wheel and collectively associated so as to form a constant reluctance flux path with the said flux producing means so as to permit the wheel when rotated toward neutral position from any turned position to magnetically act with constant effort to return the said member and said switch to a normal signal position.

3. The combination of a hollow steering shaft, a steering wheel on the shaft, a hollow fixed shaft within the steering shaft, means including a signal operating member rockably mounted on the fixed shaft, locking means for holding the member in a neutral position and two settable positions, flux producing means rockably supported on the fixed shaft, and signal switch means actuated by the said member for energizing the said flux producing means as the member is moved to one of the settable positions, said flux means arranged for constantly and uniformly tending to maintain the member in a settable position as the said wheel is moved to any degree in one direction and for moving the operating member to a neutral position as the wheel is moved to any operative degree in the opposite direction.

4. A steering wheel assembly provided with means adapted to form a portion of a direction signal circuit organization, said means including a manual control having a settable neutral position and two settable operative positions, said assembly including a steering column provided with a steering wheel including a portion of a flux path and a replaceable and removable unit including a fixed tubular member telescoped in the steering column and enveloping certain current supply leads of the organization removable therewith, and flux producing means carried by the fixed member and operable at constant permeability by the control member to be energized into uniform magnetic engagement with the said steering wheel flux path when the said control is moved into operable position whereby a subsequent selective movement of the steering wheel flux path will cause the said flux to pull on the said producing means to act to return the said control member to its neutral position.

5. In a device of the class described, the combination of a steering wheel assembly including an armature and a wheel rim, a manually actuated control mounted approximately centrally of the rim for limited rotation and movable into operative position independently of a movement of the rim, flux producing means actuated and energized by the control during its movement for subsequent uniform and continuous magnetic association with the armature portions of the said wheel for causing the said control to become continuously dependent on the motion of the steering wheel armature according to the extent and direction of the steering wheel movement, thence to become independent of the said steering wheel armature after any operable movement of the said control toward a neutral position.

6. In a device of the class described, the combination of two control members each mounted for rotary movement about a different axis, a stationary steering assembly member, a steering wheel including means constituting an armature forming a portion of a flux path of constant permeability, a circuit closer selectively movable with both of the control members, said closer manually moved into closing position by one of the control members, and magnetically out of closing position by the constant strength dynamo-electric action of the wheel armature on the other control member.

7. In a device of the class described, the combination of a steering wheel including an armature and manual and magnetic control members each mounted for rotary movement about a different axis, a stationary steering assembly member, a flux producing member rockably mounted on the stationary member so as to be magnetically associated in a flux path of constant reluctance with the armature mounted on the steering wheel, and means for permitting the manual control member to energize the said flux producing members as it is manually moved out of a neutral position.

8. In a device of the class described, the combination of a steering wheel assembly including a manually actuated signal switch and a flux producing means carried by a stationary portion of the said assembly, an armature carried by the steering wheel of the said assembly, said flux producing means normally free of the said armature and forming a constant permeability flux path with the same, said flux producing means energized by the movement of manual action of the switch to act together with the armature to magnetically return the said switch to a normal status when the said wheel is moved from any position in the opposite direction to that indicated.

9. On a vehicle having a steering wheel, the combination with a switch having a neutral position and manually actuatable selectively to two operative positions of a flux producing member energized as a function of the actuation of said switch to either operative position, and means responsive as a function of a subsequent selective rotation of the steering wheel to return said switch to neutral position.

10. On a vehicle having a steering shaft, the combination of a flux producing element mounted for limited rotation in either direction about the shaft with a magnetic member concentrically mounted for limited manual rotation in either direction independently of said element and in the field of flux produced thereby, so arranged that an initial manual rotation of the said member in one direction following a limited rotation of the said element in the opposite direction will return the said element to its original position.

11. On a vehicle provided with a steering wheel and a direction signal control switch having a neutral position and manually operable selectively to right and left indicating positions, the combination with a flux producing member energized as a function of the manual operation of said switch to either indicating position of magnetic means forming a portion of the said steering wheel and located within the path of said flux for returning said switch to neutral position upon a subsequent rotation of the steering wheel in a direction opposite to that indicated by said switch.

HOWARD J. MURRAY.
WALTER S. RUGG.

CERTIFICATE OF CORRECTION.

Patent No. 2,244,171. June 3, 1941.

HOWARD J. MURRAY, ET AL.

It is hereby certified that error appears in the above numbered patent requiring correction as follows: In the drawing, Sheet 1, Figure 1 should appear as shown below instead of as shown in the drawing --

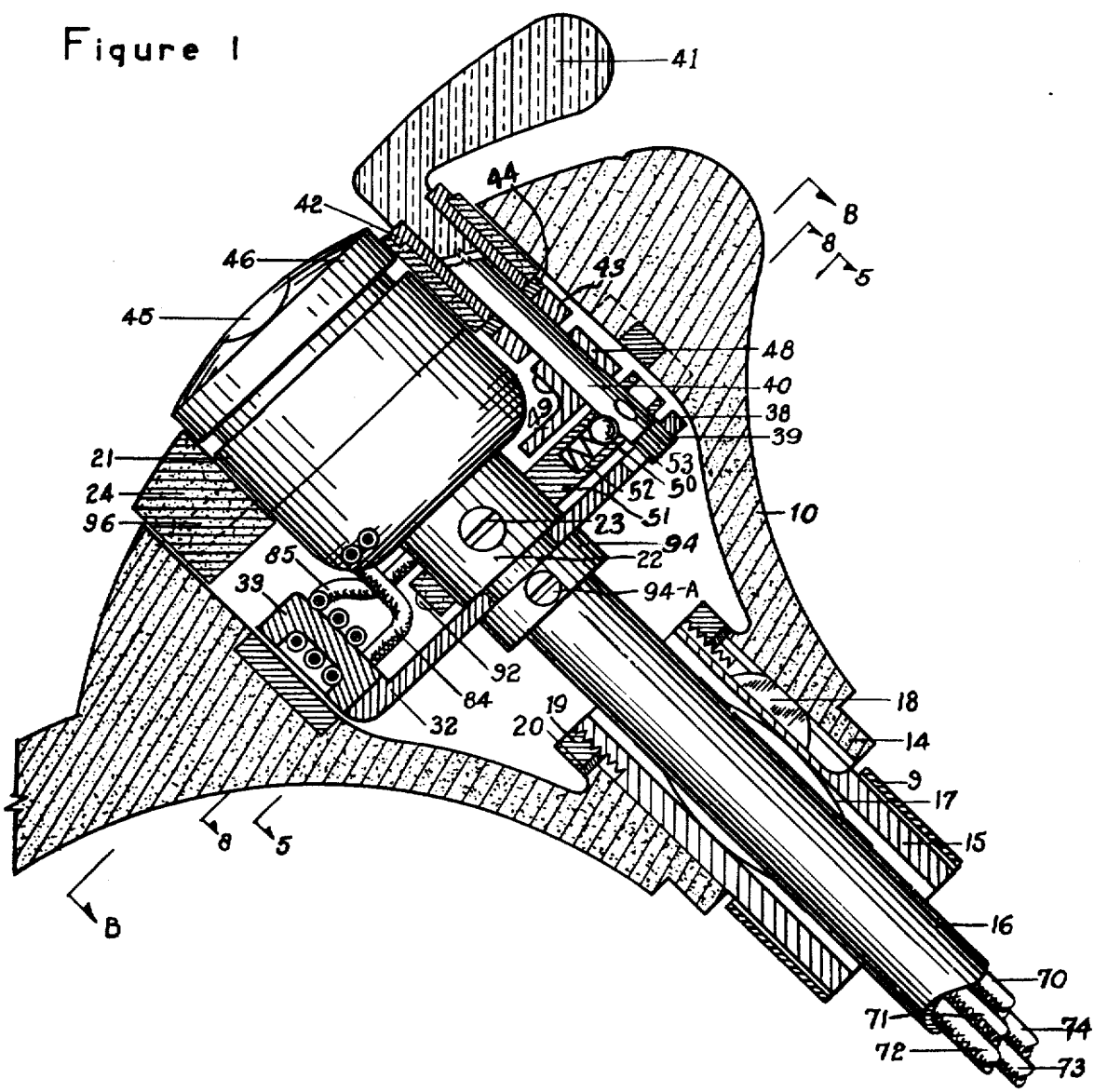

and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.